J. C. BASCUE.
CHAIN COUPLING.
APPLICATION FILED JUNE 17, 1918.
1,299,660.
Patented Apr. 8, 1919.
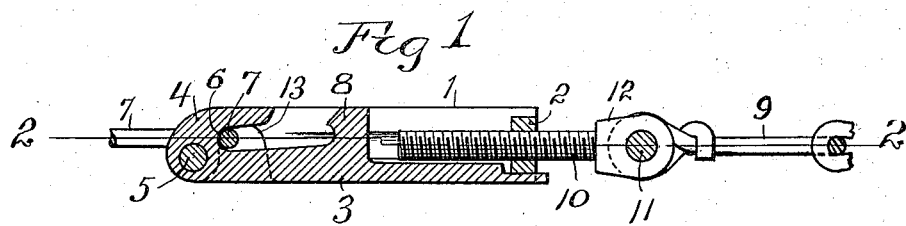
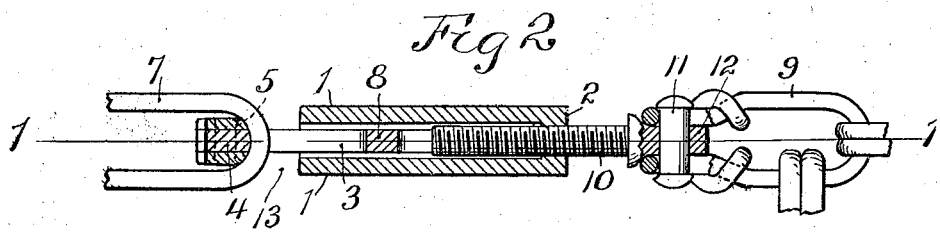
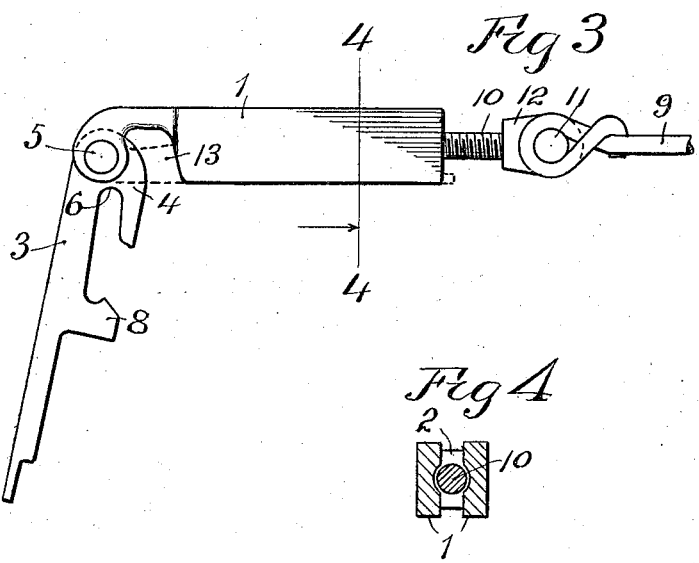
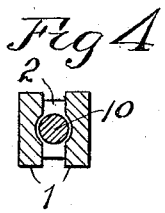
WITNESS:
R. E. Hamilton
INVENTOR.
John C. Bascue
BY Warren D. House
His ATTORNEY

UNITED STATES PATENT OFFICE.

JOHN C. BASCUE, OF INDEPENDENCE, MISSOURI, ASSIGNOR OF ONE-HALF TO MARY BRESSIE, OF INDEPENDENCE, MISSOURI.

CHAIN-COUPLING.

1,299,660.

Specification of Letters Patent.

Patented Apr. 8, 1919.

Application filed June 17, 1918. Serial No. 240,315.

*To all whom it may concern:*

Be it known that I, JOHN C. BASCUE, a citizen of the United States, residing at Independence, in the county of Jackson and State of Missouri, have invented a certain new and useful Improvement in Chain-Couplings, of which the following is a specification.

My invention relates to improvements in chain couplings.

It is particularly adapted for releasably coupling together the ends of a mud chain such as is employed on an automobile tire.

One of the objects of my invention is to provide a coupling of the kind described, which is simple in construction, which is strong and durable and not liable to get out of order, which may be cheaply manufactured, which can easily be operated by an unskilled person, and which will securely couple the ends of the chain without liability of being accidentally uncoupled when in use, and which is so arranged that the pull of the chain when in use tends to hold the coupling closed.

A further object of my invention is the provision of novel means by which the length of the coupling may be increased or diminished as the length of the chain may require.

The novel features of my invention are hereinafter fully described and claimed.

In the accompanying drawing which illustrates the preferred embodiment of my invention, Figure 1 is a longitudinal sectional view on the line 1—1 of Fig. 2, of my improved chain coupling, shown attached in the closed position to the ends of a chain, the intermediate portions of which are broken away.

Fig. 2 is a longitudinal sectional view on the line 2—2 of Fig. 1.

Fig. 3 is a plan view of the chain coupling and a portion of the chain to which it is attached, the lever being shown in solid lines in the open position and in dotted lines in the closed position.

Fig. 4 is a cross section on the line 4—4 of Fig. 3.

Similar reference characters designate similar parts in the different views.

1 designates the two arms and 2 the transverse portion of a U-shaped body member of the coupling. 3 designates a lever having at one end a hook 4 which is pivoted to and between the arms 1 adjacent to the free ends thereof by a transverse pivot pin 5, upon which the lever 3 swings from the open position shown in solid lines in Fig. 3 to the closed operative position between the arms 1, as shown in Figs. 1 and 2, and in dotted lines in Fig. 3.

The hook 4 of the lever 3 is provided with a seat 6, which is adapted to receive and support one link 7 at one end of a mud chain.

The side of the lever 3 on which is the seat 6 is provided with a lateral hook 8, located intermediate of the free end of the lever and the free end of the hook 4 and spaced apart from the latter to permit the link 7 to enter the seat 6. The hook 8 holds the link 7 from slipping off from the lever when the latter is being swung to but has not reached the closed position and for this reason the hook 8 is disposed reversely to the hook 4.

Means are provided for attaching to the body member 1 another link 9 at the other end of the mud chain. This attaching means is preferably longitudinally adjustable so that the coupling may be increased or diminished in length to suit the length of chain employed.

This attaching means comprises preferably a longitudinal screw 10, which is rotatably fitted in a longitudinal screw-threaded hole, which is provided in the transverse portion 2 of the body member.

For attaching the link 9 to the screw 10, there is provided a transverse pin 11, which extends through a transverse hole in the head 12 of the screw.

While the link 7 is detached, the body member may be turned on the screw 10 in a direction such that the length of the coupling will be increased or diminished as desired.

Each of the arms 1 is provided in one longitudinal edge with a notch 13, which permits the link 7 to pass to and from the position shown in Figs. 1 and 2.

In the operation of my invention, the body member having been properly adjusted on the screw 10 and the mud chain having been placed upon the tire with which it is to be used, the end link 7 is slipped over the lever 3 and to the inner side of the projection 8, while the lever 3 is in the position shown in solid lines in Fig. 3. The lever 3 is then swung to the closed operative position between the arms 1 of the body member, thereby forcing the link 7 into the seat 6, the link in passing to this position entering the notches 13. By means of the screw adjustment, the length of the coupling may be varied without disassembling.

The seat 6 is so located in the hook 4 that it will cross a straight line connecting the pivotal point of the lever 3 and the point of attachment of the link 9 to the screw 10, when the lever 3 is swung from the open position shown in solid lines in Fig. 3, to the closed position shown in Figs. 1 and 2.

The pivotal point of the lever 3 is the pin 5, and the point of attachment of the link 9 is the pin 11.

As the seat 6 is at one side of the straight line connecting the longitudinal centers of the pins 5 and 11, and in reaching this position in the closing movement of the lever must cross said straight line, the pull of the chain will always tend to hold the lever in the closed position and will prevent the lever from being accidentally swung to the open position, providing that the body member is properly adjusted on the screw 10, so that the chain will snugly embrace the tire.

It will be noted that the free end of the lever 3 extends slightly beyond the transverse portion 2, thereby enabling the user of the coupling to get hold of and swing the lever from the closed position to the open position, when it is desired to remove the mud chain from the tire. When the lever has been swung to the open position, the link 7 may be slipped therefrom and the chain then removed from the tire.

It will be noted that in the closed position of the lever 3, it will be embraced substantially its entire length by the arms of the body member 1 and will be disposed between the opposite longitudinal edges of said arms, as shown in Fig. 3. By means of this arrangement, there are no projecting portions on the lever which extend beyond the adjacent edges of the body, so that there is no liability of anything catching and accidentally swinging the lever to the open position.

I do not limit my invention to the structure shown and described, as modifications, within the scope of the appended claims, may be made without departing from the spirit of my invention.

What I claim is:—

1. A chain coupling comprising a body member, means for attaching thereto one link of a chain, and a lever pivoted to the body member and having at one end two reversely disposed hooks for supporting another link of the chain, said hooks, when the lever is swung from the open to the closed operative position, crossing a straight line connecting the pivotal point of the lever and the point of attachment of the first named link.

2. A chain coupling comprising a body member, longitudinally adjustable means for attaching thereto one link of a chain, and having means for adjustment without disassembling, and a lever having at one end a hook pivoted to the body member and having a seat for supporting another link of the chain, said seat, when the lever is swung from the open to the closed operative position, crossing a straight line connecting the pivotal point of the lever and the point of attachment of the first named link.

3. A chain coupling comprising a body member, a longitudinally adjustable screw having screw threaded connection with said body member and having means for attaching thereto one link of a chain, and a lever having a hook pivoted to the body member and having a seat for supporting another link of the chain, said seat, when the lever is swung from the open to the closed operative position, crossing a straight line connecting the pivotal point of the lever and the point of attachment of the first named link.

4. A chain coupling comprising a U-shaped body member, means for attaching thereto one link of a chain, and a lever having at one end a hook pivoted between and to the arms of said member, the hook having a seat for supporting another link of the chain, said seat, when the lever is swung from the open to the closed operative position between said arms, crossing a straight line connecting the pivotal point of the lever and the point of attachment of the first named link, the entire outer side of the lever in the closed position being at the inner side of the plane of the adjacent longitudinal edge of the body member.

5. A chain coupling comprising a U-shaped body member, longitudinally adjustable means for attaching thereto one link of a chain, and a lever having at one end a hook pivoted to and between the arms of said member, the hook having a seat for supporting another link of the chain, said seat, when the lever is swung from the open to the closed operative position between said arms, crossing a straight line connecting the pivotal point of the lever and the point of attachment of the first-named link, the lever in the closed position being embraced substantially its entire length by the arms of the body member and being disposed between opposite longitudinal edges of said arms.

6. A chain coupling comprising a U-shaped body member, the transverse portion of which is provided with a longitudinal screw-threaded hole, a longitudinal screw rotatably fitted in said hole and having means for attaching thereto one link of a chain, and a lever having a hook pivoted to and between said arms of said member, the hook having a seat for supporting another link of the chain, said seat, when the lever is swung from the open to the closed operative position between said arms, crossing a straight line connecting the pivotal point of the lever and the point of attachment of the first named link.

7. A chain coupling comprising a U-shaped body member, the transverse portion of which is provided with a longitudinal screw-threaded hole, a longitudinal screw rotatably fitted in said hole and having means for attaching thereto one link of a chain, and a lever having a hook at one end pivoted to and between said arms of said member, the hook having a seat for supporting another link in the chain, said seat, when the lever is swung from the open to the closed operative position between said arms, crossing a straight line connecting the pivotal point of the lever and the point of attachment of the first named link, the lever on the side having the seat being provided intermediate of its hook and its free end with a hook disposed reversely to the first named hook.

In testimony whereof I have signed my name to this specification.

JOHN C. BASCUE.

Copies of this patent may be obtained for five cents each, by addressing the "Commissioner of Patents, Washington, D. C."